United States Patent [19]
Seizert et al.

[11] Patent Number: 5,202,161
[45] Date of Patent: Apr. 13, 1993

[54] HIGH SULFUR LEVEL PLASTIC CONTAINER SULFONATION PROCESS AND ARTICLE PRODUCED THEREBY

[75] Inventors: Robert D. Seizert, Brooklyn; Mark Nulman, Birmingham, both of Mich.; Glenn T. VanVolkom, Fairless Hills, Pa.

[73] Assignee: Solvay Automotive, Inc., Houston, Tex.

[21] Appl. No.: 643,037

[22] Filed: Jan. 18, 1991

[51] Int. Cl.$^5$ .............................................. B05D 7/22
[52] U.S. Cl. ...................................... 427/237; 264/83; 264/340; 427/223; 425/74
[58] Field of Search ............ 427/237, 248.1, 255.3, 427/255.4, 400, 223; 264/83, 340; 425/74

[56] References Cited

U.S. PATENT DOCUMENTS

| | | | |
|---|---|---|---|
| 2,400,720 | 5/1946 | Staudinger et al. | 117/118 |
| 2,786,780 | 3/1957 | Walles et al. | 117/62 |
| 2,811,468 | 10/1957 | Joffre | 117/85 |
| 2,832,696 | 4/1958 | Walles | 117/69 |
| 2,937,066 | 5/1960 | Walles | 8/4 |
| 3,560,166 | 2/1971 | Walles | 264/195 X |
| 3,613,957 | 10/1971 | Walles | 427/299.3 |
| 3,617,338 | 11/1971 | Caiola et al. | 264/83 X |
| 3,740,258 | 6/1973 | Walles | 206/84 X |
| 3,862,284 | 1/1975 | Dixon et al. | 264/83 |
| 3,947,520 | 3/1976 | Lane | 264/320 |
| 3,998,180 | 12/1976 | Hawkins et al. | 427/237 X |
| 4,014,831 | 3/1977 | Bock et al. | 260/23 H |
| 4,157,432 | 6/1979 | Lundberg et al. | 526/31 |
| 4,220,573 | 9/1980 | Bock et al. | 260/23.5 A |
| 4,220,739 | 9/1980 | Walles | 525/344 |
| 4,336,015 | 6/1982 | Rainville | 425/74 |
| 4,371,574 | 2/1983 | Shefford | 428/35 |
| 4,394,333 | 7/1983 | Fukushima et al. | 264/37 |
| 4,396,567 | 8/1983 | Rainville | 264/83 |
| 4,615,914 | 10/1986 | Walles | 427/237 |
| 4,666,452 | 5/1987 | Nohr et al. | 8/115.52 |
| 4,701,290 | 10/1987 | Eschwey et al. | 264/40.1 |
| 4,743,419 | 5/1988 | Bierschenk | 264/83 |
| 4,752,428 | 6/1988 | Williams et al. | 264/83 |
| 4,775,587 | 10/1988 | Walles | 428/305.5 |
| 4,861,250 | 8/1989 | Walles et al. | 425/90 |
| 4,880,675 | 11/1989 | Mehta | 428/35.7 |
| 4,938,998 | 7/1990 | Stock | 421/223 |
| 5,030,399 | 7/1991 | Walles et al. | 264/83 |

FOREIGN PATENT DOCUMENTS 3535602 4/1987 Fed. Rep. of Germany.

Primary Examiner—Michael Lusignan
Attorney, Agent, or Firm—Willian, Brinks, Olds, Hofer, Gilson & Lione

[57] ABSTRACT

A process for treating a container comprised of a normally solid, polymer surface with a sulfur-containing compound is carried out by contacting the surface at a temperature of about 120° to about 140° F. with a sulfur-containing compound. Subsequently, the surface is contacted with a neutralizing agent. The process is conducted for a such a period of time and with such concentrations of the sulfur-containing compound and the neutralizing agent that the container has average permeability to unleaded gasoline having octane number of 93 of not greater than about 0.021 g/hr.

The surface, after the treatment, comprises about 700 to about 1800 micrograms of sulfur per square inch of the surface and it is penetrated by the sulfur-containing compound to an average depth of at least about 15 microns.

31 Claims, 10 Drawing Sheets

HIGH SULFUR LEVEL PLASTIC CONTAINER SULFONATION PROCESS AND ARTICLE PRODUCED THEREBY

BACKGROUND OF THE INVENTION

1. Field of the Invention

The invention is directed to a process for treating a container comprising a normally solid, plastic surface with a sulfur-containing compound at such conditions that the permeability of the container is substantially reduced, as compared to previously known processes. The invention is also directed to the container produced in the process.

2. Discussion of Related Art

Containers made of normally solid, plastic (i.e., made from a polymer) materials are known in the art. Such containers have a variety of uses, e.g., they can be used for storing or transporting industrial chemicals, hydrocarbons, such as fuels, and similar liquids. Plastic containers have several advantages over metal containers in a variety of applications, including transporting and storing hydrocarbon liquids. For example, plastic containers are more economical to manufacture and are more light-weight than metal containers, such as metal automobile fuel tanks, thereby adding to fuel efficiency of the automobiles in which they are used. Additionally, they can be molded into a single piece, seamless article, thereby eliminating joined surfaces, such as seams, usually required in metal containers. Seams are particularly vulnerable to leaks and may become corrosion initiation points.

Additionally, plastic containers are not susceptible to corrosion by liquids. In contrast, metal containers are particularly susceptible to corrosion by liquids which they transport, particularly alcohols and flexible fuels, such as mixtures of gasoline and alcohol. For example, it has been estimated that metal, such as terne plate steel, fuel tanks for automobiles can last only about 3 to about 5 years if they are used to transport a fuel comprising a mixture of gasoline and methanol.

It was recognized in the art that plastic containers may be permeable to vapors produced by some of such liquids. For example, polyethylene, particularly high density polyethylene (HDPE) and high molecular weight, high density polyethylene (HMW HDPE), containers have been used as fuel tanks for hydrocarbon liquids, such as gasoline and alcohols and other fuels, including "flexible fuels." The term "flexible fuels" includes mixtures of hydrocarbon fuels, such as gasoline and alcohols, which are blended for specific purposes, such as reduction in emissions to meet environmental standards.

Accordingly, various treatments have been proposed to decrease the permeability of such containers to the vapors. For example, Walles U.S. Pat. Nos. 3,613,957 and 3,740,258, disclose enclosure members fabricated of non-aromatic, hydrocarbon polymers which are rendered substantially impermeable to gasoline, hydrocarbons and other organic materials by treating the enclosure members (containers) with a sulfonating agent, such as sulfur trioxide ($SO_3$), to decrease permeability thereof. The containers are treated to such an extent that, in the preferred embodiments, the sulfonate groups are present on the surface or surfaces of the containers in the concentration of about 0.06 to about 20, preferably from about 0.1 to about 1 milligram (mg.) of sulfur trioxide equivalents per square centimeter (e.g., see the '258 Patent). According to the teachings of both of these patents, the containers are treated with the sulfonating agent after they are fabricated by any suitable means, such as in a blow-molding process.

Walles et al., U.S. Pat. No. 4,861,250, disclose an in-mold sulfonation system for sulfonating the surface of plastic articles, such as plastic containers, during molding. In the sulfonation process, sulfur trioxide at a pressure exceeding that of the mold, is introduced into the mold, such as a blow-mold, immediately before or immediately following full expansion of the formed plastic article in the mold cavity. The sulfonation step is followed by the step of neutralization with a gaseous neutralizing agent, such as ammonia gas. The sulfonation step is conducted at a temperature of 160° to 80° C., because at that temperature a minimum amount of leachable salt is produced. Adequate sulfonation levels are equal to or greater than 200 micrograms of sulfur trioxide ($SO_3$) per square centimeter. Walles et al. also state that 90% reduction in gasoline permeation rate of the blow-molded container is sufficient. That level is reached at about 22 micrograms of sulfur (S) per square centimeter ($cm^2$) at 72° F. and 50% relative humidity or at about 46 micrograms S per $cm^2$ at 100° F.

Walles, U.S. Pat. No. 4,615,914, discloses a method of treating plastic containers to provide increased barrier properties to organics and gases, such as oxygen. The method comprises treating the interior surface of the container with sulfur trioxide gas produced by inserting into the interior of the container a solid, particular material, which, upon heating, forms sulfur trioxide gas. Subsequently, the container is heated, e.g., by a microwave energy or by any other suitable means. After the sulfonation treatment, the sulfonated surface is treated with a suitable material to neutralize the sulfonic acid groups formed on the polymer to prevent the reaction of the acid groups with materials which are later placed into the container. An example of a suitable neutralizing material is ammonia gas ($NH_3$).

Walles et al., U.S. Pat. No. 2,786,780, and Walles, U.S. Pat. Nos. 2,832,696, 2,937,066 and 4,775,587, also disclose methods of sulfonating plastic, such as polyethylene, materials for the purposes of decreasing permeability thereof to various materials, or to provide a suitable outside surface for adhering dyes or other coatings thereto.

Staudinger et al., U.S. Pat. No. 2,400,720, disclose the treatment of plastic surfaces or objects with concentrated sulfuric acid, fuming sulfuric acid, sulfur trioxide or chlorsulphonic acid to render such surfaces hydrophilic, thereby enabling the application of water-soluble dyes thereto.

Lundbert et al., U.S. Pat. No. 4,157,432, disclose a bulk sulfonation process comprising mixing a hydrocarbon polymer having olefinic unsaturation or aromatic moieties, or both, by mechanical means in the absence of a solvent for the polymers with a sulfonation reagent and at a sufficient temperature and time to effect the desired degree of sulfonation.

Bock et al., U.S. Pat. Nos. 4,014,831 and 4,220,573, disclose ionic polymer compositions which include a metal-neutralized sulfonated polymer plasticized with a preferential plasticizer.

Thus, plastic containers have heretofore been sulfonated to decrease permeability thereof by contacting the containers, after they were fabricated, e.g., in a blow-molding process. They were sulfonated by contacting the containers for a suitable period of time, e.g., about 150-160 seconds, at ambient temperature with a suitable mixture of a sulfonating agent (also referred to herein as a "sulfonating compound" or a "sulfur-containing compound") and an inert gas comprising, e.g., about 15% by mole of the sulfonating agent. Subsequently, the sulfonated surface was neutralized by a suitable neutralizing agent and washed with an aqueous liquid, such as water, to remove any leachable salts. The resulting container had surface sulfonation levels of about 200 to about 400 micrograms of sulfur per square inch (mcg/in$^2$). The thus-sulfonated containers had permeability to unleaded gasoline of about 0.04 g/hr or to flex fuels (a blend of unleaded gasoline and methanol), M-10 or M-15, of about 0.08 g/hr.

The heretofore-available sulfonated plastic containers may be unable to meet newly-proposed environmental emission regulations, particularly when such containers are used for transporting flexible fuels, such as mixtures of gasoline and alcohol(s). For example, up to the present time, automobile industry has required plastic fuel tanks having sulfonation levels of between about 200 to about 400 micrograms of sulfur per 10 square inch. Such levels are considered adequate for meeting the current United States environmental emission standards limiting the hydrocarbons emissions from the entire car to a maximum of 2 grams/2hrs (g/2hr) if the car is powered by gasoline, as measured by the Shed Test, described in detail in SAE J171, June 1982, incorporated herein by reference in its entirety. Such sulfonation levels are also considered adequate for meeting current European and Japanese environmental regulations which limit the amount of hydrocarbon emissions from an automobile fuel tank to not greater than 20 grams/24 hrs.

However, newly-proposed state and federal environmental emission standards are considerably more stringent. Additionally, due to recently-enacted environmental legislation, such as Clean Air Act, limiting permissible level of hydrocarbon emissions, there is increased interest in the use of flexible fuels which are believed to produce lower emission levels in internal combustion engines. Plastic fuel tanks are more suitable than metal tanks as containers for such flexible fuels for the reasons discussed above, e.g., because plastic fuel tanks are not susceptible to corrosion. However, plastic fuel tanks are more permeable to flexible fuels than to pure hydrocarbons, such as gasoline. Therefore, plastic fuel tanks having sulfonation levels of about 200 to about 400 mcg/in$^2$ of sulfur, produced in accordance with the previously-used sulfonation processes, may be unable to meet the newly-proposed environmental restrictions.

Accordingly, it is important to provide a plastic container, such as a plastic fuel tank, which can meet the newly-proposed environmental emission standards even with new flexible fuels, such as mixtures of hydrocarbon fuels and alcohols, e.g., gasoline, and methanol or ethanol.

SUMMARY OF THE INVENTION

According to this invention, a process for treating a container, comprising a normally solid, polymer surface, with a sulfur-containing compound, comprises two steps. The first step comprises contacting the surface of the container at a temperature of about 120° to about 140° F. with the sulfur-containing compound, and the second step comprises contacting the surface of the container with a neutralizing agent. Both steps are conducted at such conditions and with such concentrations of the sulfur-containing compound and the neutralizing agent that the container has average permeability, as defined hereinafter, to unleaded gasoline having octane number of about 93, as calculated by the R+M/2 method, of not greater than about 0.021, preferably not greater than about 0.012 grams/hr (g/hr). The container also has modified average permeability, as defined hereinafter, of not greater than about 0.021 g/hr, preferably not greater than about 0.006 g/hr.

The term "unleaded gasoline", as used herein, means unleaded gasoline having octane number of about 93, as calculated by the R+M/2 method.

The container having the aforementioned permeability is obtained when the surface thereof, after the treatment with the sulfur-containing compound and the neutralizing agent, comprises about 700 to about 1800 micrograms of sulfur per square inch (mcg/in$^2$) and when the sulfur compound has penetrated the surface of the container to an average depth of at least about 15 microns. The two step process of the invention is also referred to hereinafter as the "sulfonation process".

There is also disclosed a container sulfonated by the process described above.

Additionally, according to this invention, there is provided a container having walls of a normally solid, polymer surface which has average permeability to unleaded gasoline having octane number of 93 of not greater than about 0.021 preferably not greater than about 0.012 g/hr. Such a container has modified average permeability to unleaded gasoline having octane number of 93 of not greater than about 0.021 g/hr, preferably not greater than about 0.006 g/hr.

In one preferred embodiment, the polymer surface is made of a polymer comprising a linear carbon-to-carbon backbone structure with non-aromatic substituents having a plurality of free hydrogen atoms attached to the carbon atoms. In this embodiment, the polymer surface, after the two steps of the process are completed, comprises about 700 to about 1800, preferably about 900 to about 1800, and most preferably about 1100 to about 1800 mcg/in$^2$ of sulfur. In one particularly preferred version of this embodiment, the container is a fuel container for an automobile and it is made of high molecular weight, high density polyethylene having a density of about 0.939 to about 0.959 g/cc, preferably about 0.945 to about 0.955 g/cc and flow index ($I_{21}$) of about 4 to about 13, preferably about 7 to about 10 g/10 min.

The sulfonation process of this invention provides great advantages. The process produces containers having substantially reduced permeability to hydrocarbon fuels, including flexible fuels. The containers sulfonated in the process of the invention meet or exceed the environmental emission standards newly-proposed by the United States and foreign environmental regulatory agencies. The process of the invention produces such containers with a minimum modification of the existing sulfonation apparatus, thereby requiring a limited amount of additional capital investment.

BRIEF DESCRIPTION OF THE FIGURES

The file of this patent contains at least one drawing executed in color. Copies of this patent with color drawing(s) will be provided by the Patent and Trademark Office upon request and payment of the necessary feed.

FIG. 1 represents ECE-34 Permeation Data (defined below) obtained from 15 gallon tanks, containing a mixture of 85% gas and 15% methanol. The permeation is expressed in terms of g/day; weeks 1–4 are for preconditioning. The following symbols are used to illustrate results of respective examples:

Example 8 ●
Example 9 ▲
Example D ×
Example E ◆

FIGS. 2–6 are color photomicrographs of a cross-section of a wall of General Motors' ("GM's") L-type car fuel tank, made from HDPE, having density of 0.948 g/cc and $I_{21}$ of 8.5 g/10 min, having average wall thickness of about 4.0 mm. The tanks of each Figure were subjected to different sulfonation treatments, detailed below.

Figure 2:
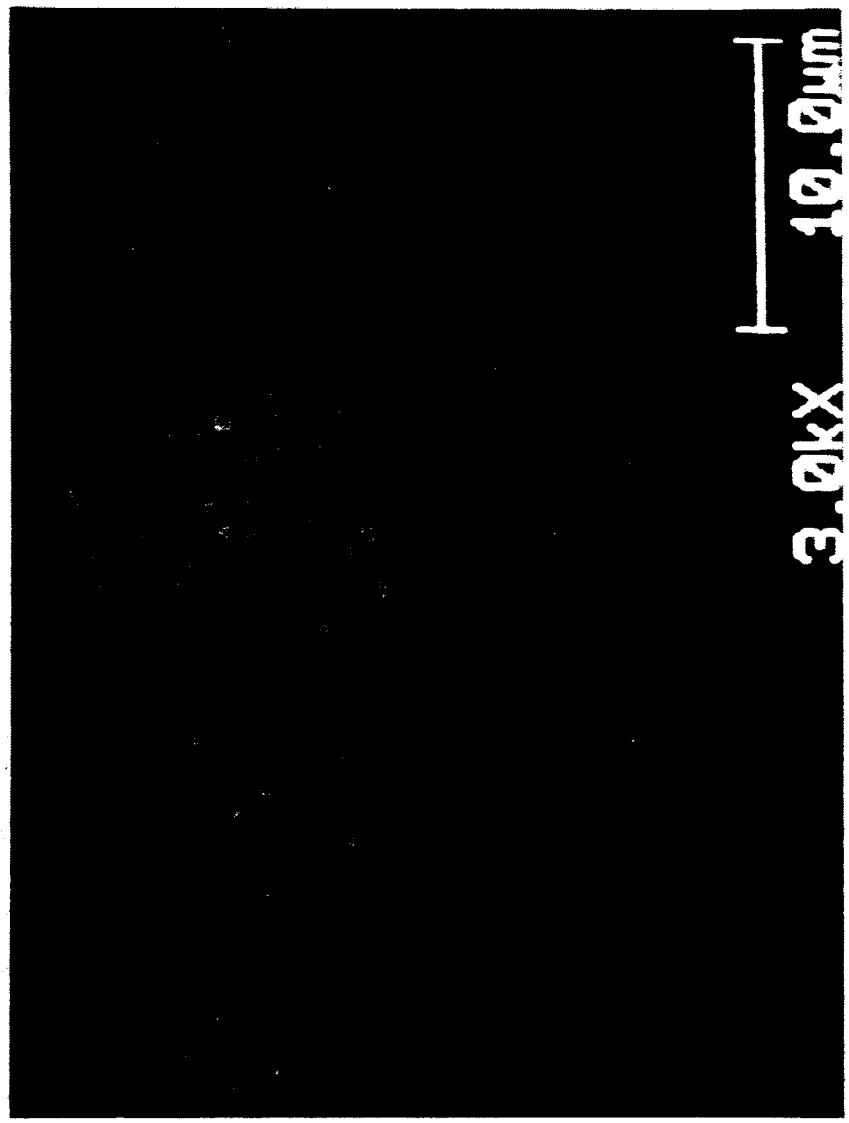

FIG. 2 is a photomicrograph of a cross-section of a fuel tank sulfonated according to a prior art process at an ambient temperature (72° F.), with gaseous $SO_3$, at $SO_3$ concentration of 15% by volume and the exposure to $SO_3$ for 138 seconds.

Figure 3:
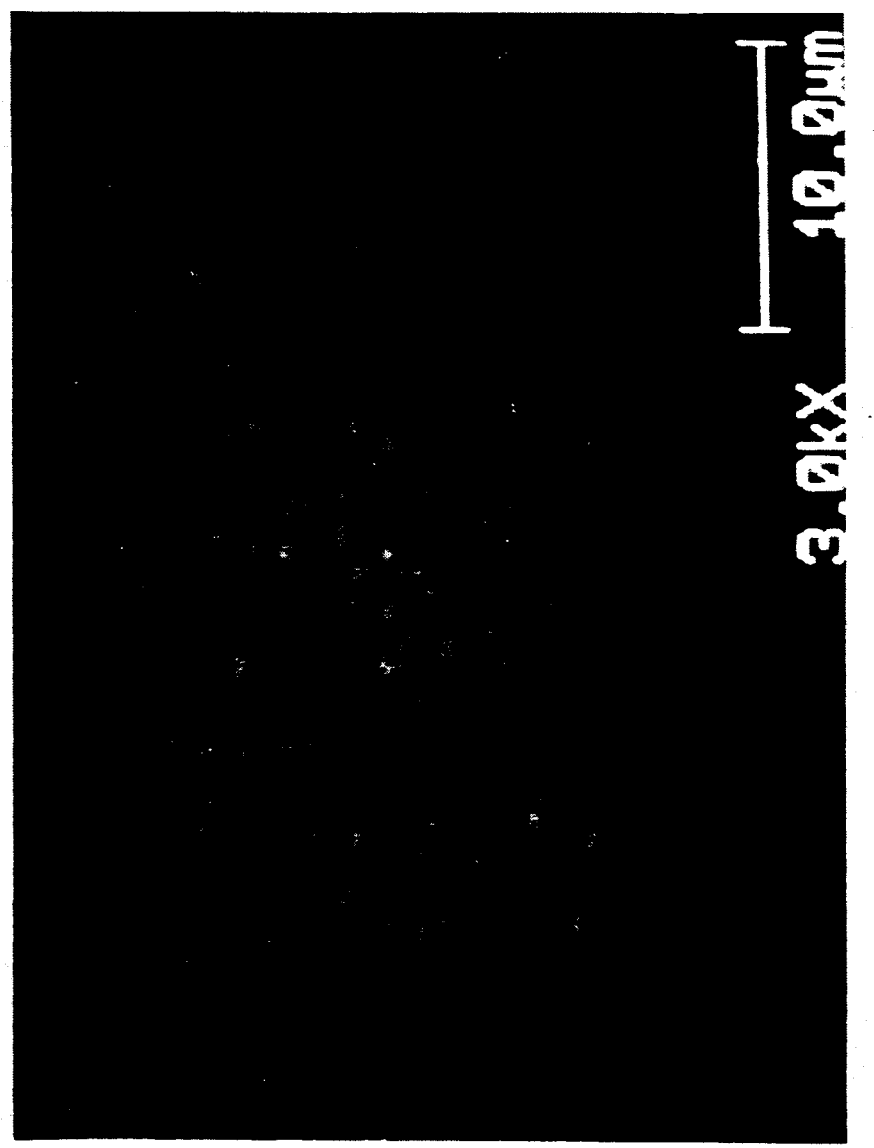

FIG. 3 is a photomicrograph of a cross-section of a fuel tank sulfonated at a temperature of 120° F., with gaseous $SO_3$ at $SO_3$ concentration of 15% by volume, and the exposure to $SO_3$ for 138 seconds.

Figure 4:
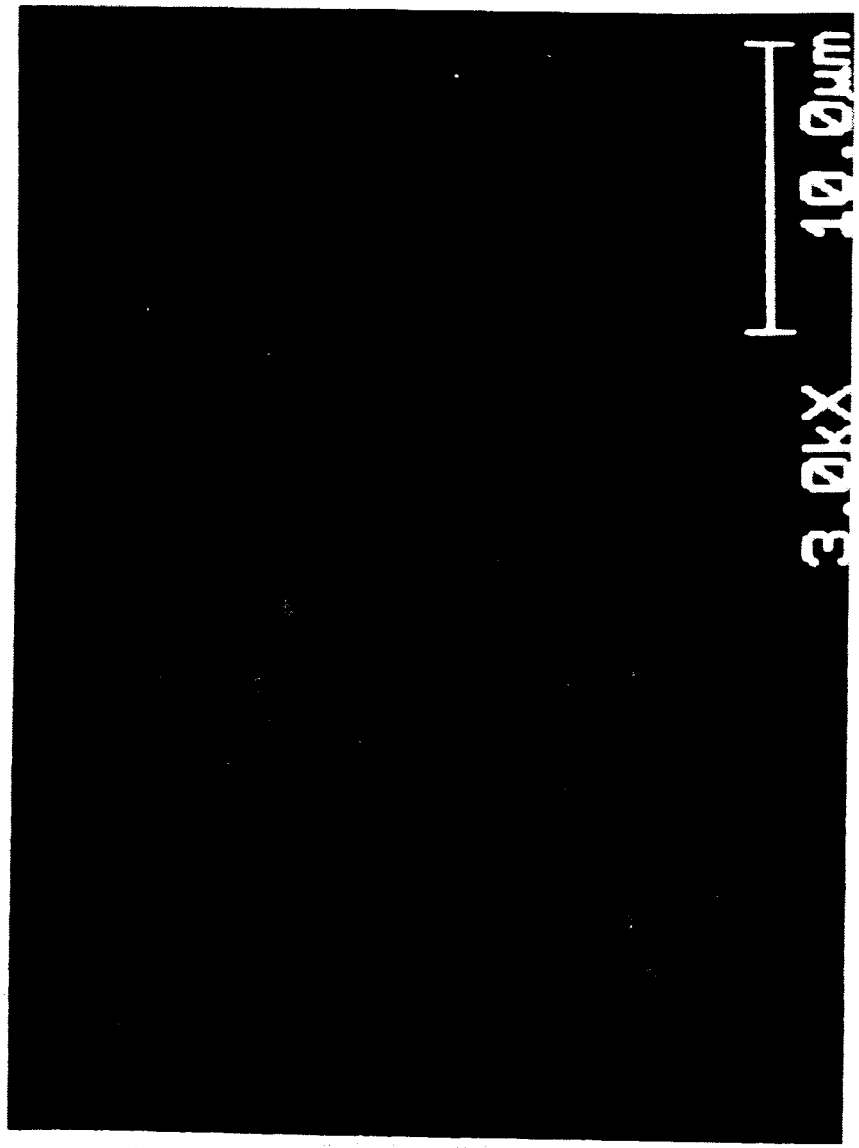

FIG. 4 is a photomicrograph of a cross-section of a fuel tank sulfonated at an ambient temperature (72° F.) with gaseous $SO_3$ at $SO_3$ concentration of 25% by vol. and the exposure to $SO_3$ for 138 seconds.

Figure 5:
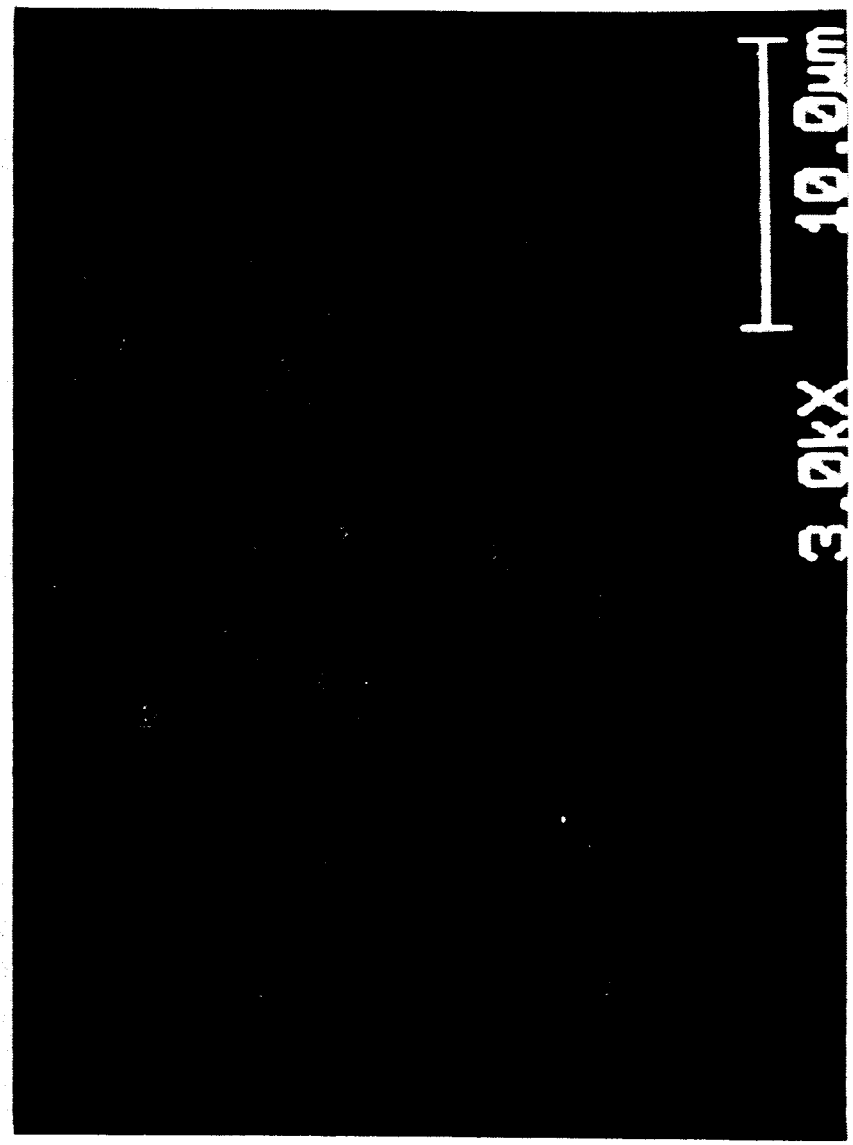

FIG. 5 is a photomicrograph of a cross-section of a fuel tank sulfonated at a temperature of 120° F. with a gaseous $SO_3$ at $SO_3$ concentration of 25% by vol. and the exposure to $SO_3$ for about 138 seconds.

Figure 6:
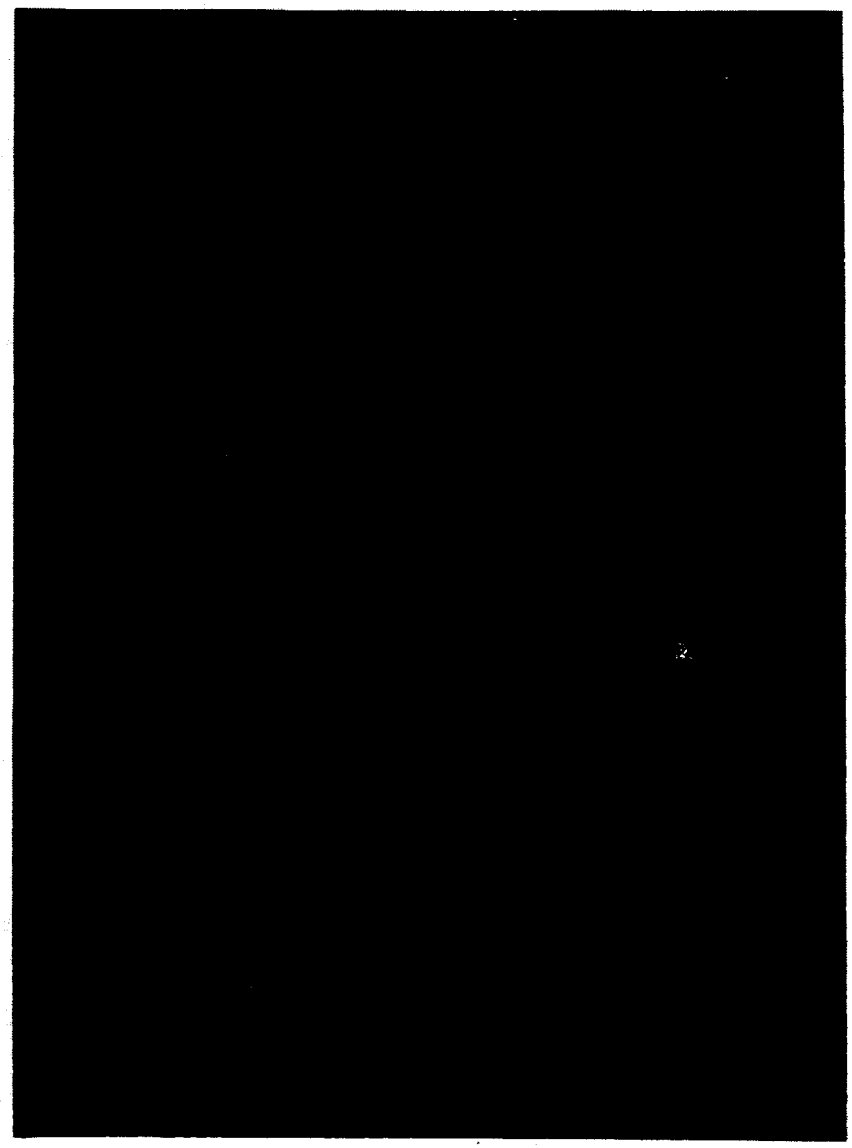

FIG. 6 is a photomicrograph of a cross-section of a fuel tank sulfonated according to the process of this application, i.e., at a temperature of 120° F. with a gaseous $SO_3$ at $SO_3$ concentration of 25% by vol. and the exposure to $SO_3$ for about 267 seconds.

Figure 7:
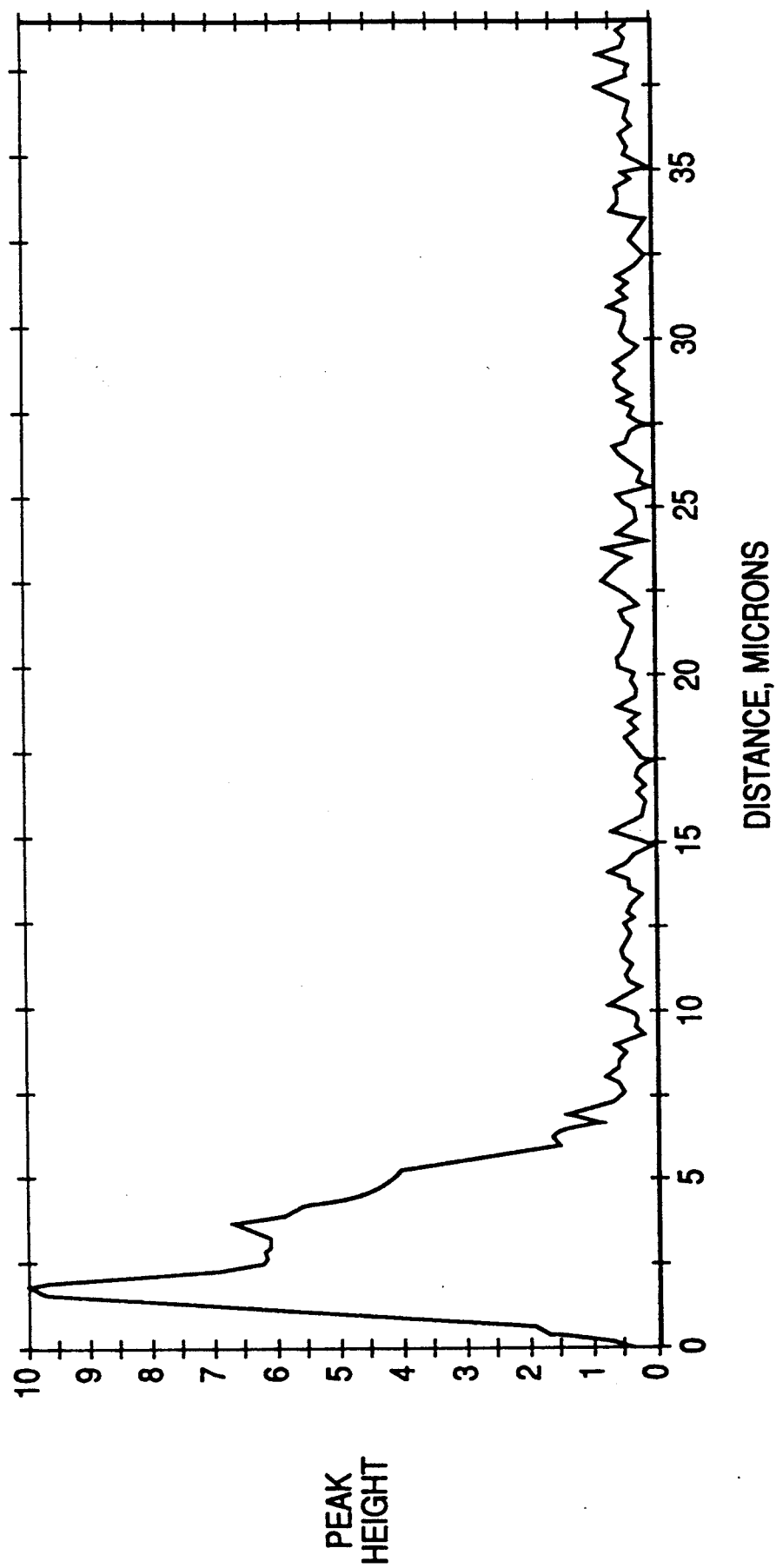

FIG. 7 is a graph of peak height (i.e., the maximum concentration of sulfur at a given depth within the material) of sulfur concentration as a function of the depth of penetration of sulfur in the fuel tank of FIG. 4.

FIG. 7 shows depth of sulfonation, shown as a distance from the treated surface in the bulk of the material. Surface sulfur content of the tank evaluated in FIG. 7 was 600 mcg/in².

Figure 8:
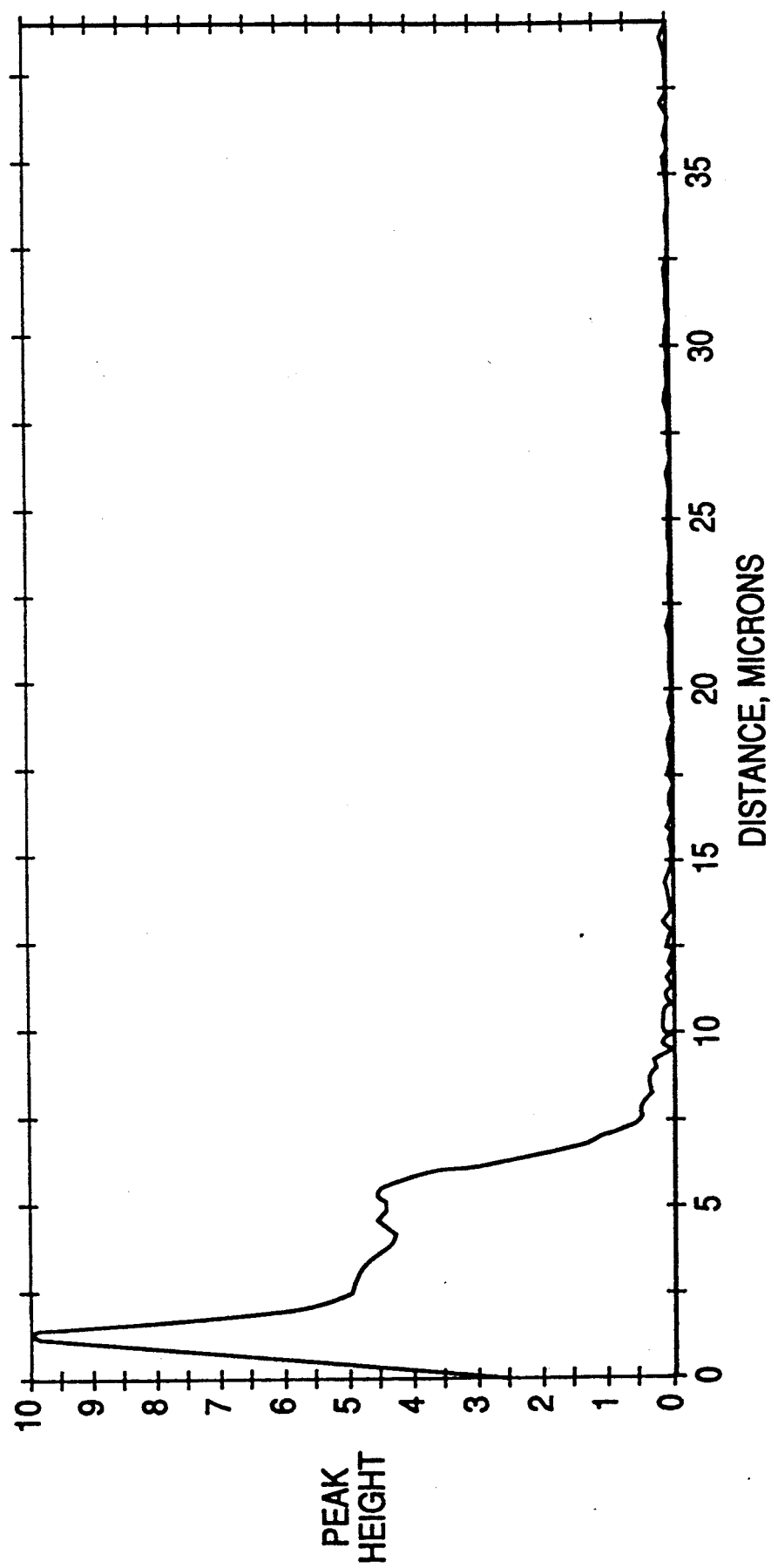

FIG. 8 is a graph of peak height of sulfur concentration as a function of the depth of penetration of sulfur in the fuel tank of FIG. 5.

FIG. 8 shows depth of sulfonation, shown as a distance from the treated surface in the bulk of the material. Surface sulfur content of the tank evaluated in FIG. 8 was 816 mcg/in².

Figure 9:
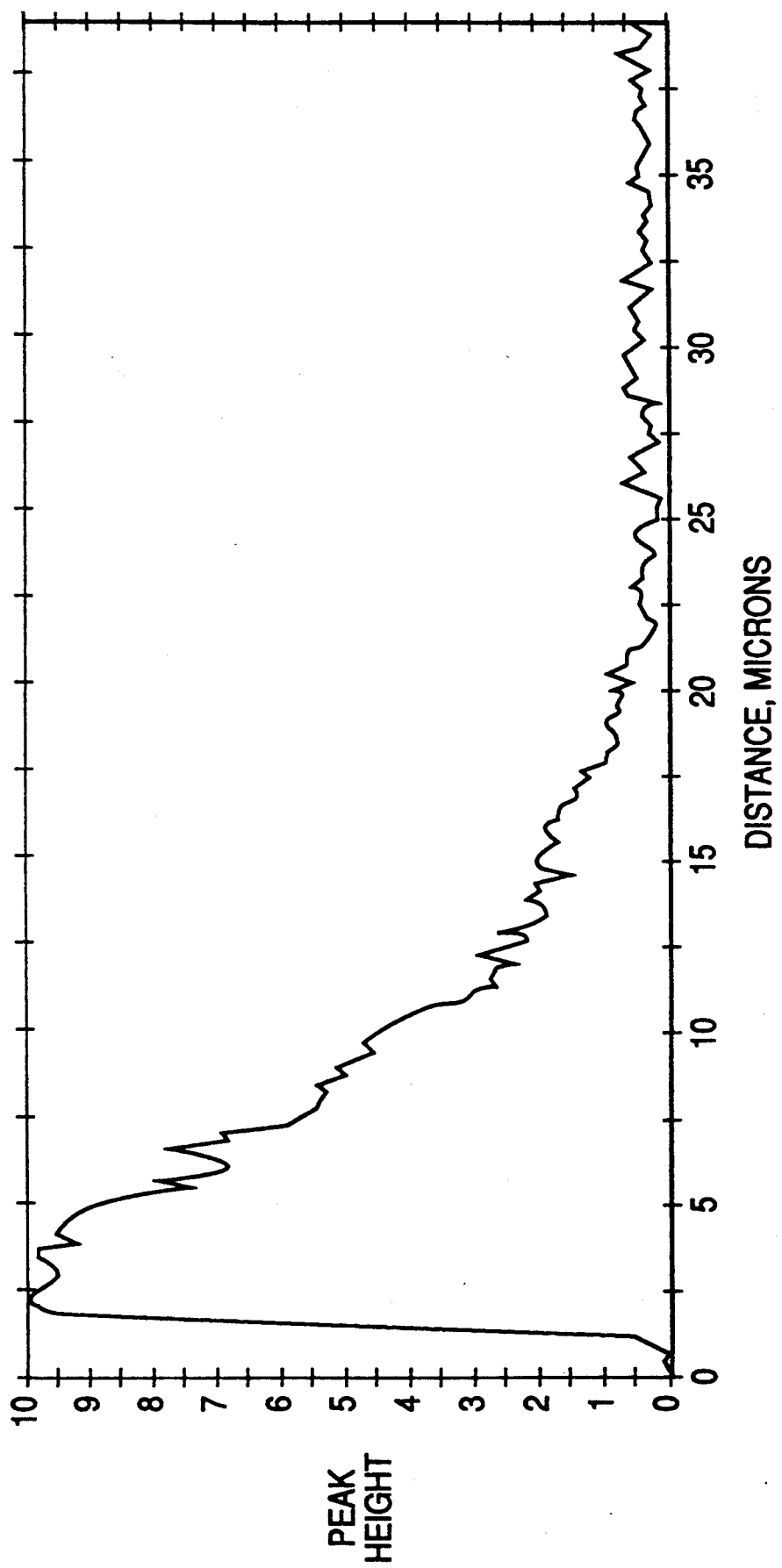

FIG. 9 is a graph of peak height of sulfur concentration as a function of the depth of penetration of sulfur in the fuel tank of FIG. 6.

FIG. 9 shows depth of sulfonation, shown as a distance from the treated surface in the bulk of the material Surface sulfur content of the tank evaluated in FIG. 8 was 1195 mcg/in².

Figure 10:
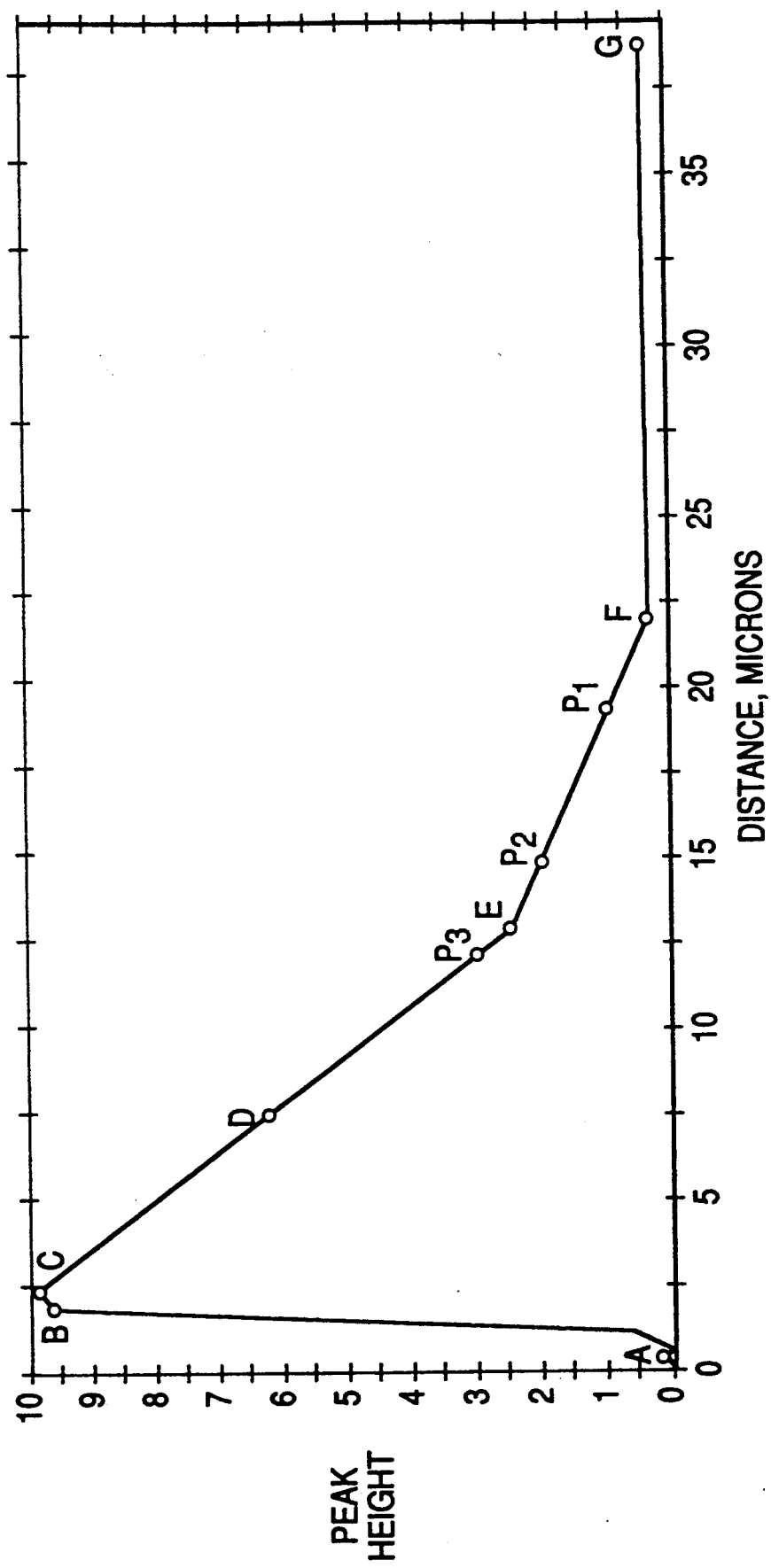

FIG. 10 is a generic graph of peak height of sulfur concentration as a function of the depth of penetration of sulfur for HDPE container sulfonated according to the process of this invention.

FIG. 10 shows depth of sulfonation, shown as a distance from the treated surface in the bulk of the material.

DETAILED DESCRIPTION OF THE PREFERRED EMBODIMENTS OF THE INVENTION

The containers which can be utilized in this invention may be any containers made of a normally solid, plastic material defining a normally solid, polymer surface. Suitable containers utilized herein are plastic fuel tanks for automobiles, aerosol cans for holding such consumer items as whipping cream, liquid soap, chemicals, and cosmetics, hoses for transporting chemicals, such as liquid fuels, solvents and natural gas, and containers for storing dry cleaning solvents and other hydrocarbon fluids, such as kerosene or gasoline.

The term "a normally solid, polymer surface", as used herein, means a surface made of a polymer material which is a solid at a temperature of about −40° to about 230° F. The polymer materials which are used to make the containers are, for example, polymers comprising a linear carbon-to-carbon backbone structure with non-aromatic substituents having a plurality of free hydrogen atoms attached to the carbon atoms. Examples of such polymers are high density polyethylene and low density polyethylene, including linear low density polyethylene.

Preferred are polymers comprising a linear carbon-to-carbon backbone structure with non-aromatic substituents, e.g., homopolymers of ethylene, homopolymers of propylene, homopolymers of isobutylene, homopolymers of butene-1, homopolymers of methyl pentene-1, homopolymers of vinyl chloride, homopolymers of vinylidene chloride, copolymers of ethylene with propylene, copolymers of ethylene with isobutylene, copolymers of ethylene with butene-1, copolymers of ethylene with $C_5$–$C_{10}$ alpha-olefins, such as pentene-1, hexene-1 or octene-1.

The preferred polymer is a high molecular weight, high density polyethylene (HMW HDPE) which is a polymer of ethylene, optionally comprising minor amounts of higher alpha-olefins, such as $C_3$–$C_{15}$ alpha-olefins, having a density of about 0.939 to about 0.959, preferably about 0.945 to about 0.955 grams/cc (g/cc), and flow index ($I_{21}$) of about 4 to about 13, preferably about 7 to about 10 g/10 min. In one preferred embodiment, the HMW HDPE has density of 0.948 g/cc and $I_{21}$ of 8.5 g/10 min. The container subjected to the treatment with the sulfur-containing compound is made by any suitable process, e.g., by blow molding or extrusion. The polymer used for making the container may contain any conventional additives, such as antioxidants, pigments, dyes or extenders known in the art. Such additives are not expected to adversely affect the sulfonation process of this invention.

The term "average permeability to unleaded gasoline of not greater than about 0.021 grams/hr" as used herein is preferably determined by an Isothermal Permeation Test, also referred to herein as a "modified Shed Test".

In the modified Shed Test, a standard automobile fuel tank, designated by General Motors Company ("GM") for use on the L-type car (e.g., Chevrolet Corsica or Berreta), having about 14 to about 15 gallons capacity, having a GM part number 2569940, and made of high density polyethylene (density of 0.948 g/cc, melt index, $I_{21}$, of 8.5 g/10 min), having average wall thickness of about 4 millimeters (mm) is filled with unleaded gasoline, such as the Howell EEE fuel, a type of unleaded gasoline having octane number of about 93 (as calculated by the R+M/2 method), to the extent of about 40% of the tank's capacity. The fuel tank is conditioned by allowing it to stand, undisturbed, in a controlled environment at a temperature of about 104° F. (40° C.) for a period of twenty-one (21) days. During this time, the gasoline is periodically agitated. Thereafter, the permeability of the tank to the gasoline is measured. The tank's permeability is measured for one (1) hour at 104° F. ±2° F. at internal vapor pressure of about 10 inches of water with the tank filled to about 40% of its capacity with the gasoline. The fuel tank is locked in a shed and maintained at the temperature of about 104°±2° F. Hydrocarbon emissions from the tank are measured and recorded for one (1) hour. The measurements, usually conducted over a period of 6–12 months, are averaged to obtain the measure of average permeability.

Alternatively, permeability may also be expressed in terms of "modified average permeability". Modified average permeability is the average of all the permeability measurements, except the lowest and the highest measurements. This measure is used in recognition of the fact that permeability of the fuel tank may depend on extrinsic factors (not related to the measurement procedure), such as atmospheric conditions, human error, or a possible error in measurement techniques, which may, occasionally, produce anomalous results. Modified average permeability excludes such anomalous results.

Average permeability and modified average permeability may also be measured by the ECE 34 Test, discussed below in Examples 8–9, D (Comparative) and E (Comparative), or a Shed Test, discussed above. If the Shed Test or the ECE 34 Test are used, the values of average and modified average permeability are determined in the same manner as set forth above in connection with the determination of these values with the modified Shed Test. If the Shed Test is used to measure these values, the results would be expressed in grams/2 hours (g/2hrs).

The aforementioned definitions of average permeability and modified average permeability are set forth herein for convenience and in recognition of the fact that permeability to any fluids, such as hydrocarbons, e.g., unleaded gasoline, may vary depending on the type of the material used to make the container, the type of fluid stored therein, the shape of the container and a number of other factors. These definitions of average permeability and modified average permeability provide those skilled in the art with a standard measure of permeability of their containers and the effectiveness of sulfonation processes used to reduce permeability of such containers.

These definitions also provide those skilled in the art with a ready means of comparing a given sulfonated container to the sulfonated container of this invention, or a given sulfonation process to the sulfonation process of this invention. For example, if one wishes to determine whether the permeability of a container X, made from a polymer different than the HMW HDPE used to make the standard automotive fuel tank identified above, the container X having been treated with a sulfur-containing compound to reduce permeability of the container X, falls within the average or modified average permeability levels defined above, one would manufacture the standard automotive fuel tank defined above (i.e., a GM tank for Chevrolet Corsica or Chevrolet Berreta having GM part number 2569940) from the above-defined HMW HDPE (i.e., having density of 0.948 g/cc and $I_{21}$ of 8.5 g/10 min) and treat the standard fuel tank with the same sulfur-containing compound and in the same manner as the container X. The average permeability and the modified average permeability of such a standard automotive fuel tank made from the HMW HDPE would then be determined in the manner defined above.

Similarly, if one wishes to determine whether a given sulfonation process satisfies the definition of the sulfonation process defined herein, one would conduct such a given process on the standard automotive fuel tank defined above, made from the HMW HDPE defined above. Subsequently, the average permeability and the modified average permeability of the tank would be determined in the manner set forth above.

The process of this invention comprises the steps of:

(A) contacting the interior surface, or both the interior and the exterior surface, of the container at a temperature of about 120° to about 140° F., preferably at about 120 to about 135° F., and most preferably at about 130° F., with a sulfur-containing compound; and, (B) contacting the surface with a neutralizing agent.

After the neutralizing step is completed, the treated surface of the container is washed with pressurized spray of a suitable solvent, preferably water, to remove any remnants of the sulfonation process.

The term "contacting ... the surface with ... a sulfur-containing compound", as used herein, includes the actual contact of the selected surface of the container with the sulfur-containing compound and the subsequent period of soaking the surface with the sulfur-containing compound. After the actual contact of the selected surface of the container with the sulfur-containing compound, the sulfur-containing compound is allowed to soak into the surface of the container. The sum of time periods of the actual contact of the surface with the sulfur-containing compound and the subsequent soaking of the surface with the sulfur-containing compound is also referred to herein as the "exposure" of the surface to the sulfur-containing compound, such as $SO_3$.

The container is contacted with the sulfur-containing compound for at least about 175 seconds preferably for about 240 to about 420 seconds, and most preferably for about 270 to about 420 seconds. In one preferred embodiment of the invention, the container is contacted with the sulfur-containing compound for about 290 seconds.

The temperature of the container prior to and during the sulfonation process of this invention is increased to about 120°–140° F. by any suitable means. In one preferred embodiment of the invention, the temperature of the container is increased, prior to the commencement of the sulfonation process, by blowing hot air into the interior of the container. The temperature of the container is measured, at the same time, by a temperature sensor placed on the outside wall of the container. When the sensor registers the desired temperature, the flow of hot air is terminated. Subsequently, the container is subjected to the sulfonation process of this invention. The length of exposure of the container to the hot air, in this preferred embodiment of the invention, will depend on the initial temperature thereof. For example, if the container is stored, prior to the sulfonation process, at a relatively low ambient temperature, the length of exposure of the container to hot air will be relatively long to increase the temperature of the container to the aforementioned required temperature of about 120°–about 140° F. Conversely, if the temperature of the container is above ambient temperature because, for example, the blow-molded container is ejected from the blow mold shortly before the sulfonation process, the time of exposure of the container to the hot air in this preferred embodiment will be relatively short to bring the temperature of the container to the required temperature of about 120°–about 140° F.

Any inorganic sulfur-containing compound may be used in the process of this invention. Suitable sulfur-containing compounds are sulfur, sulfur trioxide, a mixture of methyl chloride and sulfur trioxide or mixtures thereof. It is preferred, however, to use a sulfur-containing compound which is a gas. The vapor phase sulfur-containing compound is preferably used as a mixture with inert gases, such as nitrogen, carbon dioxide and air. The concentration of the sulfur-containing compound in such a mixture is at least about 25% by volume, preferably about 25 to about 35% by volume, and most preferably about 28 to about 35% by volume. The inert gas should be substantially free of moisture to prevent any adverse reaction between the sulfur-containing compound and water. Gaseous sulfur trioxide ($SO_3$) is the most preferred sulfur-containing compound. In one particularly preferred embodiment, the concentration of gaseous $SO_3$ in the mixture with dry air is about 30% by mole.

If the sulfur-containing compound is a liquid, and it is used as a mixture with other liquids, the concentration thereof is substantially the same as set forth above for gaseous mixtures, i.e., at least about 25%, preferably about 25 to about 35%, and most preferably about 28 to about 35% by volume.

After the step of contacting the surface of the container with the sulfur-containing compound is completed, the surface contacted with the sulfur-containing compound is neutralized by contacting it with a neutralizing agent. The neutralizing step is preferably conducted at an ambient temperature.

Examples of suitable neutralizing agents are alkali metal hydroxides or salts of weak acids and the alkali metals, alkaline earth metal hydroxides or salts of weak acids and the alkaline earth metals, heavy metal chlorides or sulfates, primary, secondary or tertiary amines, ammonia, ammonium hydroxide, or mixtures thereof.

Examples of alkali metal hydroxides and weak acid salts thereof are sodium hydroxide, potassium hydroxide, lithium hydroxide, sodium carbonate, sodium hypochlorite, sodium bicarbonate, sodium acetate, potassium carbonate, potassium bicarbonate, potassium acetate, lithium carbonate, lithium bicarbonate and lithium acetate.

Examples of alkaline earth metal hydroxides or weak acid salts thereof are calcium hydroxide, barium hydroxide, strontium hydroxide, magnesium hydroxide, calcium acetate, barium acetate, strontium acetate, magnesium acetate, calcium carbonate, barium carbonate, strontium carbonate and magnesium carbonate.

Examples of the heavy metal chlorides or sulfates which can be used are stannous chloride, ferrous sulfate, nickel sulfate, cobalt sulfate and manganese sulfate.

Examples of the amines which can be used are primary, secondary and tertiary saturated aliphatic amines of 2–5 carbon atoms which, preferably, are liquids at ambient conditions and are water soluble. Specific examples of such amines are methylamine, ethylamine, propylamine, butylamine, pentylamine, dimethylamine, diethylamine, dipropylamine, dibutylamine, dipropylamine, trimethylamine, triethylamine, tripropylamine, tributylamine, tripentylamine, diethylmethylamine, dimethylethylamine and dimethylpropylamine. In one preferred embodiment the neutralizing agent is ammonia or calcium carbonate.

The step of contacting the surface of the container with the neutralizing agent is conducted for such a period of time that it produces the container having the permeability characteristics and the level of penetration of the sulfur-containing compound into the surface of the container set forth in this application.

The neutralizing step is suitably conducted by adding the aforementioned neutralizing agent(s) to water in such an amount that the resulting solution comprises about 1 to about 20% by weight of the neutralizing agent. The solution is then sprayed onto the container surface to be neutralized. The contact time of the neutralizing agent with the surface is such that at least about 90%, preferably about 95 to about 100% of the sulfonate groups (if sulfur trioxide is used as the sulfur-containing compound) on the surface of the container is converted to the corresponding salts thereof. If a sulfur-containing compound other than sulfur trioxide is used, the contact time of the neutralizing agent with the surface is such that at least about 90%, preferably about 90 to about 100%, of the sulfur-containing groups formed by such a compound on the surface is converted to corresponding salt groups thereof. The sulfonate groups are believed to be neutralized only on the surface of the container, since we believe that it is difficult, if not impossible, to neutralize a substantial proportion of sulfonate groups which penetrate beneath the surface of the container. The extent of neutralization can be easily determined by those skilled in the art in a conventional manner.

The pressure at which the sulfonation and the neutralization steps are conducted can be atmospheric, super-atmospheric or subatmospheric. For purposes of convenience, however, both of these steps are carried out at atmospheric pressure. The resulting container has the permeability characteristics and the surface sulfur penetration levels defined herein.

The sulfonation process of this invention is conducted at such conditions and with such concentration of the sulfur-containing compound and the neutralizing agent that the container has average permeability to unleaded gasoline of not greater than about 0.021, and preferably not greater than about 0.012 g/hr, and modified average permeability of not greater than about 0.021 g/hr, preferably not greater than about 0.006 g/hr.

After the sulfonation process is completed, i.e., after the neutralizing step and the subsequent step of washing the surface with the solvent are completed, the surface comprises about 700 to about 1800, preferably about 900 to about 1800, and most preferably about 1100 to about 1800 micrograms of sulfur per square inch ($mcg/in^2$). The surface sulfur content may be measured by any suitable means, but, preferably, it is measured by an X-ray fluorescence method with, for example, Panalyzer 4000 Model, manufactured by Panametrics, Inc. of Waltham, Mass.

After the sulfonation process is completed, the surface of the container is penetrated by sulfur (provided by the sulfur-containing compound) to an average depth of at least about 15 microns, preferably at least about 17 microns, and most preferably about 20 microns to about 25 microns. In one preferred embodiment, the surface of the container is penetrated by sulfur to an average depth of about 20 microns. The term "surface of the container is penetrated by sulfur to an average depth of at least about 15 microns" means that the depth of penetration of the sulfur into the surface of the container, averaged for all of the surfaces of the container, is at least about 15 microns.

The depth of penetration of sulfur into the surface of the container can be determined by any conventional methods known to those skilled in the art, such as, X-ray Photoelectron spectroscopy (ESCA) or, preferably, by the Auger Electron Spectroscopy Method (AES), described, e.g., in *Analytical Chemistry of Surfaces*, JOURNAL OF CHEMICAL EDUCATION, Vol. 61, No. 6, June 1984. As is known to those skilled in the art, presently known methods of measuring the depth of penetration of the sulfur-containing compound detect the presence of elemental sulfur. In the context of this invention, the detection of elemental sulfur at a given depth beneath the treated surface of the container is a reliable indication of the penetration of the sulfur-containing compound to the same depth. Accordingly, the terms "surface. . . penetrated by sulfur" and "surface. . . penetrated by a sulfur-containing compound" are used interchangeably herein.

The difference between the measurements of the surface sulfur content and the depth of penetration of sulfur-containing compound beneath the surface of the container is as follows: the surface sulfur content measurement determines the content of sulfur substantially only on the surface treated with the sulfur-containing compound, while the measurement of the sulfur-containing compound beneath the surface of the container determines the content of sulfur substantially only in the depth of the container wall, beneath the surface treated with the sulfur-containing compound.

The surface of the containers, after the sulfonation process of this invention is completed, also has a substantially greater density of sulfur than the surface of a comparable container sulfonated according to the prior art sulfonation processes. This is illustrated in FIGS. 2-9. These figures are color photomicrographs of cross-sections of HDPE fuel tanks sulfonated with gaseous $SO_3$ in accordance with sulfonation procedures of prior art (FIG. 2), modified sulfonation procedures of prior art (FIGS. 3-5) and with the sulfonation process of this invention (FIG. 6). In particular, in FIG. 2 the fuel tank was sulfonated at conditions representative of a prior art sulfonation process. In FIG. 3, the fuel tank was sulfonated at the temperature used in the process of this invention, but otherwise at the conditions representative of a prior art sulfonation process. In FIG. 4, the fuel tank was sulfonated at the concentration of $SO_3$ of this invention, but otherwise at the conditions representative of a prior art sulfonation process. In FIG. 5, the fuel tank was sulfonated at the temperature and $SO_3$ concentration of this invention, but otherwise at the conditions representative of a prior art sulfonation process. The photomicrographs of FIGS. 2-6 were obtained with the Scanning Auger Microprobe made by Perkin-Elmer.

FIGS. 7-9 are graphical representations (also obtained with the Scanning Auger Microprobe) of the maximum sulfur concentration as a function of depth of sulfur penetration in the fuel tanks used for photomicrographs of FIGS. 4, 5 and 6, respectively. As shown in FIGS. 7-9, the depth of penetration of sulfur increases as the concentration of the $SO_3$ and the temperature of the sulfonation process are increased. It is particularly surprising that in the fuel tank of FIG. 6, the depth of the sulfur penetration is about 20 microns (FIG. 9), whereas in the fuel tanks of FIGS. 4-5 it is only about 7.5 microns (FIGS. 7 and 8). Therefore, FIGS. 7-9 illustrate that sulfur penetrates substantially deeper into the plastic wall of the containers treated in accordance with this invention than into the wall of containers sulfonated in accordance with prior art processes.

FIGS. 2-6 also illustrate the density of sulfur beneath the surface of the sulfonated tanks. The presence of sulfur is indicated by the orange color in these Figures, and the density of the sulfur compound is directly proportional to the uniformity and depth of penetration of the orange color into the thickness of the wall of the container. The orange color at the surface of the fuel tank in FIG. 6 is substantially more uniform and substantially devoid of black-colored regions (indicating sulfur compound-free areas) than in FIGS. 4 or 5. This indicates that density of the sulfur compound in the fuel tank sulfonated according to the process of this invention is substantially higher than in the fuel tanks sulfonated according to prior art sulfonation processes (FIG. 2) or modified prior art sulfonation processes (FIGS. 3-5).

FIG. 10 is a generic graphical illustration of the depth of penetration of sulfur into the sulfonated surface. This generic illustration represents the pattern of peak height of sulfur concentration as a function of the depth of penetration of sulfur beneath the sulfonated surface in any container made from HDPE, sulfonated in accordance with the process of this invention. FIG. 10, therefore, represents the pattern of sulfur penetration into the average depth of the wall of a container resulting from the sulfonation process of this invention. This pattern is defined as reaching the peak sulfur content level at the surface subjected to the sulfonation treatment, at the point B, with the sulfur content decreasing from the peak value substantially along a trend line defined by points C-D-E-F. Accordingly, about 30% of the peak of the sulfur content is reached at the depth of about 12.5 microns (point $P_3$), about 20% of the peak of the sulfur content is reached at the depth of about 15 microns (point $P_2$) and about 10% of the peak of the sulfur content is reached at the average depth of about 20 microns (point $P_1$). The graphs of FIGS. 7-10 were also obtained with the Scanning Auger Microprobe, identified above.

The term "average depth of the wall of the container" designates the depth of the wall of the container, measured from the surface treated with the sulfonation process (i.e., the depth of the wall of the container beneath the surface).

We found that the process of this invention produces containers having substantially decreased permeability, as compared to containers sulfonated in accordance with the heretofore-known processes.

The improvement in permeability of the containers produced in accordance with the present invention may be expressed in terms of factors representing multiples of the decrease of permeability, as compared to comparative, untreated containers. For example, comparable HDPE untreated containers have average permeability to unleaded gasoline, as defined herein, of about 0.4 g/hr. Comparable HDPE containers sulfonated in accordance with prior art processes have average permeability to unleaded gasoline, as defined herein, of about 0.04 g/hr. Comparable HDPE containers sulfonated in accordance with the process of this invention have average permeability to unleaded gasoline, as defined herein, of not greater than about 0.021, preferably about 0.007 g/hr. Thus, the containers sulfonated in accordance with prior art processes had permeability to unleaded gasoline reduced by a factor of about 10, while the containers produced in accordance with the present invention have permeability to unleaded gasoline reduced by a factor of about 19, preferably about 57.

For example, similar containers sulfonated substantially in accordance with the processes of prior art, e.g., the teachings of Walles, U.S. Pat. No. 3,740,258, Example 16, at the conditions of ambient temperature (about 72° F.) with 15% by volume of $SO_3$ in air, have permeability to unleaded gasoline of about 0.08 g/hr. This is about 20% of permeability of the same containers prior to the sulfonation treatment of Walles.

Without wishing to be bound by any theory of operability, it is believed that the reasons for the substantially reduced permeability of the containers produced in accordance with the process of this invention are the combination of:

the elevated temperature during the sulfonation step;
the increased concentrations of the sulfur-containing compounds; and,
the prolonged sulfonation times.

It is believed that these factors produce containers having the above-specified depth of penetration of their surface with the sulfur-containing agent, which substantially decreases the permeability of the containers.

The following Examples further illustrate the essential features of the invention. However, it will be apparent to those skilled in the art that the specific reactants and reaction conditions used in the Examples do not limit the scope of the invention.

In the following Examples, Example A (Comparative) illustrates the sulfonation process of prior art; Examples B and C (Comparative) illustrate the effect of increasing the sulfonation treatment temperature on the level of sulfonation of the tank; Examples 1 and 2 illustrate the sulfonation process of our invention; Examples 3–7 summarize the permeability studies conducted with the tanks of Examples A, B, C, 1 and 2; Examples 8–11, D and E summarize the permeability studies with the tanks having approximately the same capacity and wall thickness as, but a different shape than, the tanks of Examples A-C, 1 and 2.

EXAMPLE A (Comparative)

This Example is a Comparative Example wherein an automobile fuel tank was treated with a sulfonating agent ($SO_3$) at an ambient temperature (about 72° F.). The tank was a General Motors (GM) fuel tank for an "L" car, having the capacity of 14 gallons (gal), and the GM part designation of 22569940. The tank was made from HDPE having a density of 0.948 g/cc, flow index ($I_{21}$) of 8.5 g/10 min which contained 0.2% by weight of carbon black. The tank was sulfonated with the apparatus substantially the same as that of British patent specification 1,595,928, incorporated herein by reference in its entirety. The tank was held in an upright position on a sulfonating line, and the interior tank surface was sprayed with a nozzle connected to an $SO_3$ vessel. The interior tank surface was contacted with vapor from an $SO_3$ holding vessel. The interior tank surface was contacted with a gaseous mixture comprising about 15% by volume of $SO_3$ and 85% by volume of dry air injected into the tank through a nozzle. The $SO_3$ was then allowed to soak into the interior surface of the tank for 138 seconds by keeping the tank on the platforms of the rotary manifold of the sulfonation line for that period of time.

In Example A and in Examples B, C, 1 and 2, set forth below, the interior surface of the tanks, after sulfonation, was neutralized by contacting that surface with a humidified ammonia ($NH_3$) mist, comprising about 70% by volume of $NH_3$ and about 30% by volume of air and water. The neutralization step was conducted at 72° F., at ambient pressure, and for 46 seconds. Subsequently, the surface of each tank was washed with water.

Permeability of the tank was evaluated in the manner set forth below in Examples 3–7. The results of the permeability evaluation of the tank of this Example and of the tanks of the remaining Examples are summarized in Table 1.

EXAMPLES B, C (Comparative)

In these Comparative Examples two tanks, one each for Examples B and C, identical to that of Example A were sulfonated at an elevated temperature (120° F.) to determine the effect of the increased temperature on the level of sulfonation. Accordingly, all of the remaining sulfonation, neutralization and washing conditions were identical to those of Example A.

EXAMPLES 1,2

(Sulfonation At Elevated Temperature & For Extended Time)

In these Examples, two tanks, one each for Examples 1 and 2, identical to those used in the Comparative Examples A, B and C, were subjected to the sulfonation treatment of this invention. The tanks were preheated, prior to sulfonation, to 120° F., and subsequently sulfonated in the manner similar to that of Examples A, B and C, except that the $SO_3$ concentration was increased to about 25% by volume and the $SO_3$ was allowed to soak into the surface of the tanks for a longer period of time than in Examples A, B and C. The soak time in each of the Examples 1 and 2 was 276 seconds.

EXAMPLES 3-7

(Permeability Studies)

In these Examples, the tanks of Comparative Examples A, B and C, and of Examples 1 and 2 were subjected to permeability studies to determine the permeability of the tanks to unleaded gasoline. The permeability studies were conducted in substantially the same manner for all tanks, summarized below for Example 3, conducted with the tank of Comparative Example A.

The permeability of the tank of Comparative Example A was measured by an Isothermal Permeation Test (also referred to herein as a modified Shed Test method).

In summary, the Isothermal Permeation Test comprises initially conditioning the tank for about twenty one (21) days and then conducting the permeability test. The conditioning treatment comprises filling about 40% of the tank's capacity with the Howell EEE fuel, capping the tank and allowing the tank to soak with the fuel for about twenty one (21) days. During this time, the fuel is periodically agitated.

After the conditioning treatment is concluded, the permeability test is conducted. The permeability test is conducted for one (1) hour at 104° F.±2° F. with the tank filled to about 40% of its capacity with the Howell EEE fuel. The fuel tank is locked in a shed and maintained at the temperature of about 104°±2° F. Hydrocarbon emissions from the tank are measured and recorded for one (1) hour.

The Isothermal Permeation Test was conducted over a period of about 248 days, at time intervals of about 30 days. The permeability measurements after about 185, about 220 and about 248 days are reported in Table 1, below.

TABLE 1

| Ex. | Tank of Ex. | Sulf. Temp. (°F.) | Treatment SO$_3$ Contact Time (sec) | Tank Sur. Sulf. Level (mcg S/in$^2$)* | Actual Permeability Level (g/hr) | | | Average Permeability Level (g/hr) | | | Modified Average Permeability Level (g/hr) | | |
|---|---|---|---|---|---|---|---|---|---|---|---|---|---|
| | | | | | After About 185 Days | After About 220 Days | After About 248 Days | After About 185 Days | After About 220 Days | After About 248 Days | After About 185 Days | After About 220 Days | After About 248 Days |
| 3 | A | 72 | 138 | 336 | 0.024 | 0.035 | 0.043 | 0.015 | 0.018 | 0.021 | 0.05 | 0.017 | 0.020 |
| 4 | B | 120 | 138 | 294 | 0.043 | 0.025 | 0.029 | 0.018 | 0.019 | 0.020 | 0.016 | 0.018 | 0.019 |
| 5 | C | 120 | 138 | 400 | 0.106 | 0.103 | 0.105 | 0.066 | 0.071 | 0.075 | 0.067 | 0.073 | 0.078 |
| 6 | 1 | 120 | 276 | 700 | 0.007 | 0.007 | 0.050 | 0.005 | 0.005 | 0.011 | 0.005 | 0.005 | 0.006 |
| 7 | 2 | 120 | 276 | 700 | 0.008 | 0.042 | 0.048 | 0.006 | 0.011 | 0.016 | 0.007 | 0.007 | 0.013 |

*Estimated

The results indicate that the increase in the SO$_3$ soak time at the same sulfonation treatment temperature decreased permeability by about 20 to about 93% (e.g., compare average permeability of Examples 4 and 5 to that of Examples 6 and 7). Accordingly, the data illustrates that sulfonation treatment of this invention substantially reduces permeability of the HDPE tanks to unleaded gasoline.

The average and modified average permeability data is believed to provide a more meaningful basis for comparison than the actual permeability data because the former is a more reliable illustration of the trend of permeability over a relatively long period of time.

Similar improvements are expected in permeability to other fuels, such as methanol, ethanol, kerosene, diesel fuels and mixtures of gasoline with ethanol or gasoline with methanol.

EXAMPLES 8-9, D (Comparative) and E (Comparative)

(Permeability Studies)

In these Examples, the fuel tanks having approximately the same capacity and wall thickness as, but a different shape than, the tanks of Examples A-C, 1 and 2 were subjected to permeability studies to determine the permeability of the tanks to a flexible fuel comprising 85% by volume of unleaded gasoline and 15% by volume of methanol. The permeability studies were conducted using the ECE 34 Test. In the ECE 34 test, the tank is filled with the fuel to about 40- about 50% of its capacity, and the tank is allowed to stand, undisturbed, in a controlled environment at a temperature of about 104° F. (40° C.) and Reid Vapor Pressure (RVP) of 9 psig for a period of about four (4) weeks. Thereafter, the permeability of the tank to the fuel is measured by the method comprising measuring the tank weight loss (in grams/day) on a weekly basis. The measurements are usually conducted over a period of eight (8) weeks. However, in these Examples, i.e., Examples 8-9, D (Comparative) and E (Comparative), the measurements were conducted for about twenty three (23) weeks. In Examples 8-9, D (Comparative) and E (Comparative) the permeability studies were conducted at Reid Vapor Pressure of 14 psig.

The tanks of Examples 8 and 9 were sulfonated according to the process of this invention, i.e., with a mixture of about 75% of dry air and about 25% (by volume) of SO$_3$ for about 282 seconds at about 120° F. The tanks in Examples 8 and 9 had surface sulfur levels of about 1200 mcg/in$^2$. The results of this evaluation are graphically illustrated in FIG. 1.

Additionally, one tank identical to that of Example 8, but untreated with sulfur (Example D, Comparative), and one tank identical to that of Example 8, but treated by a previously-known sulfonation process, i.e., a tank sulfonated at ambient temperature to such an extent that it had surface sulfur concentration of about 200 to about 400 mcg/in$^2$ (Example E, Comparative) were also subjected to the same permeability studies. The results of the studies for tanks of Examples D and E are also illustrated in FIG. 1.

Figure 1:
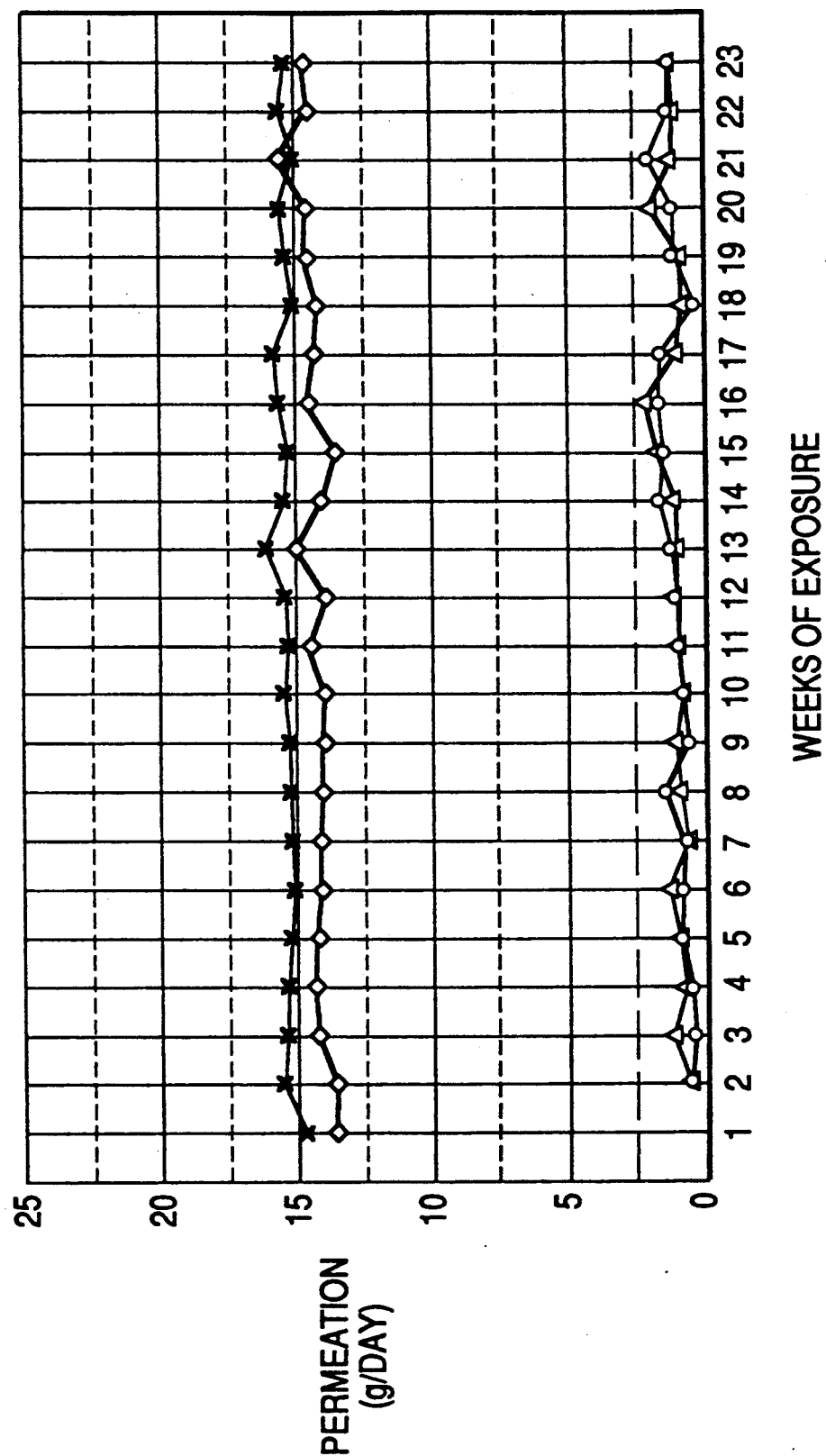
FIG. 1 is a graphical representation of the results of Examples 8–9, D (Comparative) and E (Comparative).

The data of FIG. 1 illustrates the substantial reduction in permeability to flexible fuels of the fuel tanks sulfonated in accordance with the process of this invention, as compared to a comparable unsulfonated fuel tank (Example D) and a comparable fuel tank sulfonated according to a prior art sulfonation process (Example E).

It will be apparent to those skilled in the art that specific embodiments discussed above can be successfully repeated with ingredients equivalent to those generically or specifically set forth above and under variable process conditions.

It is therefore intended that the foregoing detailed description be regarded illustrative rather than limiting, and that it be understood that it is the following claims, including all equivalents, which are intended to define the scope of this invention.

We claim:

1. A process for treating a container comprising a normally solid, polymer surface with a sulfur-containing compound comprising the steps of:
   (A) contacting the surface at a temperature of about 120° to about 140° F. with the sulfur-containing compound;
   (B) contacting the surface with a neutralizing agent, the steps (A) and (B) being carried out for a sufficient period of time and with a sufficient concentration of the sulfur-containing compound and the neutralizing agent so that the container has average permeability to unleaded gasoline having octane number of 93 (unleaded gasoline) of not greater than about 0.021 grams/hr (g/hr).

2. A process of claim 1 wherein the container has average permeability to unleaded gasoline of not greater than about 0.012 g/hr.

3. A process of claim 2 wherein the container has modified average permeability to unleaded gasoline of not greater than about 0.021 g/hr.

4. A process of claim 3 wherein the container has modified average permeability to unleaded gasoline of not greater than about 0.006 g/hr.

5. A process of claim 4 wherein the sulfur-containing compound is in a vapor phase.

6. A process of claim 5 wherein the surface after the treatment of said steps (A) and (B), comprises about 700 to about 1800 micrograms of sulfur per square inch (mcg/in$^2$).

7. A process of claim 6 wherein the surface comprises about 900 to about 1800 mcg/in$^2$ of sulfur.

8. A process of claim 7 wherein the surface comprises about 1100 to about 1800 mcg/in$^2$ of sulfur.

9. A process of claim 1 wherein the surface is penetrated by the sulfur-containing compound to an average depth of at least about 15 microns.

10. A process of claim 9 wherein the surface is penetrated by the sulfur-containing compound to an average depth of at least about 17 microns.

11. A process of claim 10 wherein the surface is penetrated by the sulfur-containing compound to an average depth of about 20 to about 25 microns.

12. A process of claim 11 wherein the polymer comprises a linear carbon-to-carbon backbone structure with non-aromatic substituents having a plurality of free hydrogen atoms attached to the carbon atoms.

13. A process of claim 12 wherein the polymer is selected from the group consisting of a homopolymer of ethylene, a homopolymer of propylene, a homopolymer of isobutylene, a homopolymer of butene-1, a homopolymer of methyl pentene-1, a homopolymer of vinyl chloride, a homopolymer of vinylidene chloride, a copolymer of ethylene with propylene, a copolymer of ethylene with isobutylene, a copolymer of ethylene with butene-1, a copolymer of ethylene with pentene-1, a copolymer of ethylene with methyl pentene-1 and a copolymer of ethylene with octene-1.

14. A process of claim 13 wherein the neutralizing agent is an alkali metal hydroxide or a salt of a corresponding weak acid, an alkaline earth metal hydroxide or a salt of a corresponding weak acid, a heavy metal chloride, a heavy metal sulfate, a primary, secondary or tertiary amine, ammonia, ammonium hydroxide or mixtures thereof.

15. A process of claim 14 wherein the neutralizing agent is the alkaline earth metal hydroxide or a salt of a corresponding weak acid.

16. A process of claim 14 wherein the neutralizing agent is calcium carbonate or ammonia.

17. A process of claim 2 wherein the container is made from HDPE, the process producing the pattern of sulfur penetration into the depth of the wall of the container beneath the surface such that the peak sulfur content is reached at a depth of about 2 to about 4 microns from the surface of the container, with the sulfur content decreasing from the peak value substantially along a trend line defined by points C-D-E-F of FIG. 10.

18. A process of claim 17 wherein about 30% of the peak of the sulfur content is reached at the depth of about 12.5 microns ($\mu$), about 20% of the peak of the sulfur content is reached at the depth of about 15 $\mu$ and about 10% of the peak of the sulfur content is reached at the depth of about 20 $\mu$.

19. A process of claim 5 wherein the vapor phase sulfur-containing compound is in the form of a mixture with inert gases comprising at least about 25% by volume of the sulfur-containing compound.

20. A process of claim 19 wherein the mixture comprises about 25 to about 35% by volume of the sulfur-containing compound.

21. A process of claim 20 wherein the mixture comprises about 28 to about 35% by volume of the sulfur-containing compound.

22. A process of claim 2 wherein the sulfur-containing compound is sulfur, sulfur trioxide, a mixture of methyl chloride and sulfur trioxide, or a mixture thereof.

23. A process of claim 22 wherein the sulfur-containing compound is sulfur trioxide.

24. A process of claim 1 wherein the container is contacted with the sulfur-containing compound in step (A) for at least about 175 seconds.

25. A process of claim 24 wherein the container is contacted with the sulfur-containing compound for about 240 to about 420 seconds.

26. A process of claim 25 wherein the container is contacted with the sulfur-containing compound for about 270 to about 420 seconds.

27. A process of claim 26 wherein the container is contacted with the sulfur-containing compound for about 290 seconds.

28. A process for treating a container comprising a normally solid, polymer surface with a sulfur-containing compound comprising the steps of:
  (A) contacting the surface at a temperature of about 120° to about 140° F. with the sulfur-containing compound, in a vapor phase in the form of a mixture with inert gases comprising at least about 25% by volume of the sulfur-containing compound for at least about 175 seconds; and
  (B) contacting the surface with a neutralizing agent, to produce a container which has average permeability to unleaded gasoline having octane number of 93 of not greater than bout 0.021 grams/hr (g/hr).

29. A process of claim 28 wherein the polymer is selected from the group consisting of a homopolymer of ethylene, a homopolymer of propylene, a homopolymer of isobutylene, a homopolymer of butene-1, a homopolymer of methyl pentene-1, a homopolymer of vinyl chloride, a homopolymer of vinylidene chloride, a copolymer of ethylene with propylene, a copolymer of ethylene with isobutylene, a copolymer of ethylene with butene-1, a copolymer of ethylene with pentene-1, a copolymer of ethylene with methyl pentene-1 and a copolymer of ethylene with octene-1.

30. A process of claim 29 wherein the polymer is a high molecular weight, high density polyethylene having a density of about 0.939 to about 0.959 g/cc.

31. A process of claim 1, wherein the step (B) is conducted at an ambient temperature.

* * * * *